United States Patent [19]

Ledbetter et al.

[11] 4,403,796
[45] Sep. 13, 1983

[54] EXPANSION JOINTS

[75] Inventors: Stephen G. Ledbetter, Charleston; Michael P. Singleton, Goose Creek; Thomas J. Johns, Summerville; James L. Fabian, Goose Creek, all of S.C.

[73] Assignee: RM Industrial Products Company, Inc., North Charleston, S.C.

[21] Appl. No.: 411,616

[22] Filed: Aug. 26, 1982

Related U.S. Application Data

[63] Continuation-in-part of Ser. No. 286,791, Jul. 27, 1981, abandoned, which is a continuation of Ser. No. 89,513, Oct. 30, 1979, abandoned.

[51] Int. Cl.³ .............................................. F16L 33/00
[52] U.S. Cl. .................................. 285/223; 138/125; 285/235; 285/405
[58] Field of Search ............... 285/229, 226, 235, 236, 285/405, 223; 138/124, 125, 126; 428/247, 251, 285, 286

[56] References Cited

U.S. PATENT DOCUMENTS

| | | | |
|---|---|---|---|
| 2,788,804 | 4/1957 | Larkin | 138/125 |
| 2,984,503 | 5/1961 | Cunningham | 138/126 X |
| 3,039,795 | 6/1962 | Reuter | 285/235 |
| 3,647,247 | 3/1972 | Pintard et al. | 285/235 X |
| 3,682,202 | 8/1972 | Buhrmann et al. | 138/126 |
| 4,026,585 | 5/1977 | Berghofer | 285/229 |
| 4,044,799 | 8/1977 | Higbee et al. | 138/125 |
| 4,091,063 | 5/1978 | Logan | 138/125 X |
| 4,140,338 | 2/1979 | Kazmierski et al. | 285/229 |
| 4,186,949 | 2/1980 | Bartha et al. | 285/229 X |
| 4,289,338 | 9/1981 | Cook | 285/229 |

FOREIGN PATENT DOCUMENTS 1284920 1/1962 France .............................. 138/125

Primary Examiner—Thomas F. Callaghan
Attorney, Agent, or Firm—Gary, Juettner & Pyle

[57] ABSTRACT

An expansion joint for connecting a pair of adjacent ducts or the like is made up from a material having improved properties. The material comprises a sheet of knit wire covered on at least one side with a vulcanized fluoroelastomer.

9 Claims, 6 Drawing Figures

EXPANSION JOINTS

CROSS REFERENCE

This is a continuation-in-part of co-pending application Ser. No. 286,791, filed July 27, 1981, and now abandoned which is a continuation of application Ser. No. 89,513, filed Oct. 30, 1979, now abandoned.

BACKGROUND OF THE INVENTION

This invention relates to temperature and acid-resistant flexible hollow couplings, sometimes referred to as expansion joints. Expansion joints connect pipes, ducts and the like, and such joints are usually installed to allow limited movement of one part relative to another due to thermal expansion, vibration, misalignments and the like. Such joints are typically used to connect fluid inlet or outlet ducts, such as are found in large drying, exhaust, heating, ventilating and power generating systems. These flexible joints may be quite large and may be made of a continuous length or belt of flexible material sometimes having a flange along each edge for connection to corresponding flanges of the ductwork.

Typical expansion joints are illustrated in U.S. Pat. No. 3,460,856, U.S. Pat. No. 3,633,946, U.S. Pat. No. 3,874,711, U.S. Pat. No. 3,997,194, U.S. Pat. No. 3,934,905, U.S. Pat. No. 3,647,247, and U.S. Pat. No. 3,811,714.

Conventional expansion joints are usually made from a coated heat resistant fabric that is also impervious to prevent leakage of gas therethrough. Multiple layers of materials may be required to provide satisfactory insulating properties in a hot environment. Conventional materials have included elastomers vulcanized onto woven fabrics of inorganic fibers such as asbestos or fiberglass, or organic fibers, such as aramids. In some cases, metal wire is inserted into the yarns before weaving for improved properties. Woven fabrics, however, may not be stretched to any significant degree, i.e., typically less than 20 percent, and it is necessary to use sufficiently excess material in the joint to accommodate any forceable movement between the adjacent ducts.

Difficulties have been experienced with the durability of expansion joints wherein the joint is composed of a laminate of rubber and internal reinforcing woven materials, such as those composed of glass, asbestos, or synthetic polymer materials. Many applications for expansion joints require continuous operation at temperatures above 300 to 400 degrees F and short durations to 800 degrees F wherein the joint may also be subjected to a highly corrosive atmosphere, such as acid vapor or gas. Under these circumstances, such conventional joints tend to rather quickly degrade, losing tensile strength and flexibility, and the elastomer layers tend to delaminate from the fabric layer.

Fluoroelastomers generally have higher temperature ratings than other elastomers, and it would be desirable to use such elastomers in expansion joints. Unfortunately, however, various problems arise when fluoroelastomers are used in combination with reinforcing fabrics composed of materials such as asbestos, glass or synthetic polymer textiles. Fluoroelastomers can emit corrosive acids at elevated temperatures. In some cases, it is difficult to form a strong bond in the lamination process. Under actual service conditions, the fibers tend to absorb acid vapors, thus accelerating degradation of the joint. Also, it has been found that combinations of glass fibers and fluoroelastomers are unstable at the higher temperatures, with the result that the elastomer loses flexibility and adhesion to the fibers.

SUMMARY OF THE INVENTION

The present invention provides an expansion joint assembly composed of a combination of materials that are uniquely suitable for expansion joints. The desirable properties of the aforesaid fluoroelastomers are combined with a reinforcing layer of knit wire mesh. The wire mesh may be selected from materials that are relatively chemically inert, and the knitted mesh has good elongation properties that are more comparable to the elastomer than the woven fiber reinforcements of the prior art. The fluoroelastomer is coated or sheeted onto both sides of a wire mesh central layer and is cured under heat and pressure. Since the wire mesh has an open, porous structure, the elastomer layers form homogeneous bond sites through the wire mesh layer, resulting in high laminate bond strength which is not dependent upon adhesion between the outer elastomer layer and the inner or core layer. Also, the mesh layer does not tend to act as a wicking medium for corrosive gases or vapors, thus minimizing the problem of chemical degradation.

The fluoroelastomer and wire mesh laminate are formed into a continuous belt, either with or without flanges, and the belt is provided with means to secure the belt between a pair of opposed ducts or passageways, whereby to flexibly connect such passageways. The thus formed expansion joint is capable of elongation along or at angles to the axis of the passageways of in excess of 70 percent without damage to the laminate. Also, the material can withstand temperatures in excess of 300 to 400 degrees F. in a corrosive environment for long periods without loss of significant flexibility or tensile strength.

THE DRAWING

DESCRIPTION OF THE PREFERRED EMBODIMENT

Figure 1:
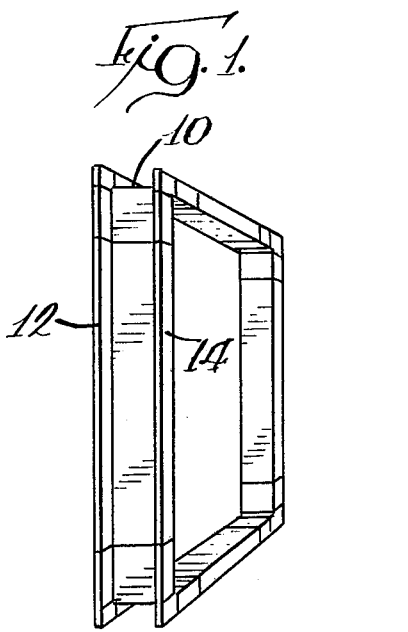
FIG. 1 is a perspective view of one type of an expansion joint.

FIG. 1 illustrates an expansion joint in which the composite laminated material of the present invention is beneficially employed. The expansion joint generally comprises a continuous or connected wall 10 composed of flexible material, said wall conforming to the shape of the ducts or passageways that are to be connected, such as the rectangular shape shown. The expansion joint also includes means for connecting the joint to the ducts, such as a pair of continuous integral or attached flanges 12 and 14 extending outward from the opposite edges of the wall 10 in a continuous fashion around the perimeter of the joint. The purpose of the flanges 12 and 14 is to enable connection of the joint by bolts or other suitable fasteners around the space between adjacent passageways or ducts (not shown) having similarly flanged surfaces. In other applications, the flanges 12 and 14 are omitted, and the expansion joint is in the form of a continuous belt or tube that is connected near its opposite edges to the adjacent ducts. Upon installation, the expansion joint provides a flexible and fluid tight connection between the adjacent ducts, which may be subject to considerable thermal expansion or contraction, vibration, misalignment, and the like.

Figure 2:
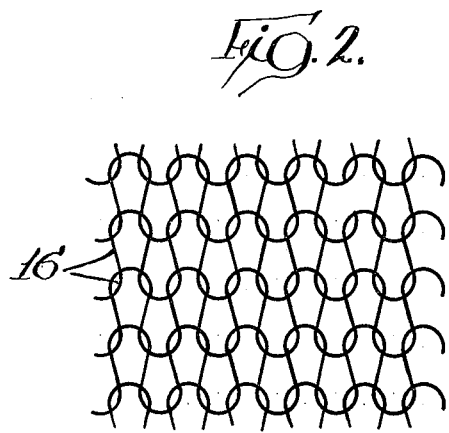
FIG. 2 is a plan view of a knit mesh used in the expansion joint material of the present invention.

FIG. 2 illustrates the general form of the knit mesh used in connection with the expansion joint of the present invention. The material is a single knit mesh formed by conventional knitting of wire and comprises interconnected loops 16. The knitted mesh is characterized by being very porous and by having the ability to be flexible and to substantially stretch lengthwise or widthwise without losing the ability to recover. The composition of the wire used in the knitted mesh is preferably one having high temperature and chemical resistance, such as inconel, stainless steel, or the like.

In order to make the composite or laminated expansion joint material of the present invention, the knitted mesh shown in FIG. 2 is cut or otherwise provided in the desired width of the belt. The sheet of mesh material is then preferably covered on both sides with a sheet of uncured fluoroelastomer, which is compounded to contain the necessary curing agents. The assembly is then placed under heat and pressure, causing elastomer on both sides to penetrate the mesh and become interbonded, and also causing the elastomer to cure. The resulting laminate is a sheet of cured elastomer having the wire mesh completely embedded therein. The overall thickness of the resulting sheet material laminate will be in the order of from about 0.06 to 0.250 inches.

The types of fluoroelastomers that may be used in connection with the present invention include copolymers of vinylidene fluoride and hexafluoropropylene, terpolymers of vinylidene fluoride, hexafluoropropylene and tetrafluoroethylene, and alternating copolymers of propylene and tetrafluoroethylene. Such fluoroelastomers are available commercially under the trademarks "VITON", "FLUOREL", "AFLAS" and the like.

Figure 3:
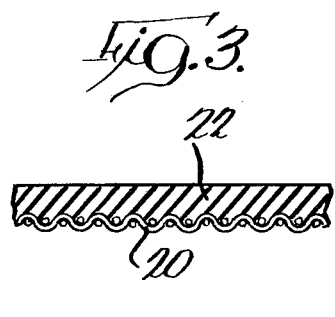
FIGS. 3, 4, 5 and 6 are schematic views illustrating various combinations or layers of materials used to make the expansion joint material of the present invention.
Figure 5:
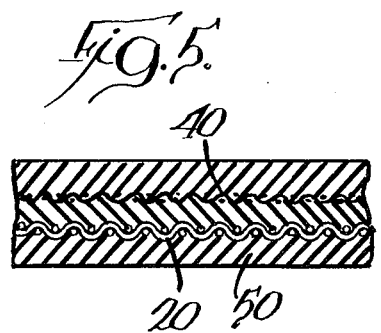
Figure 4:
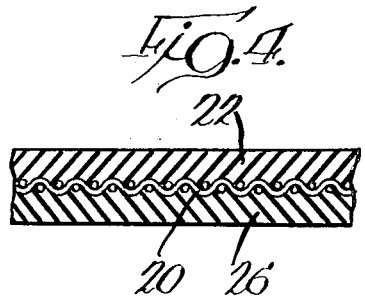
Figure 6:
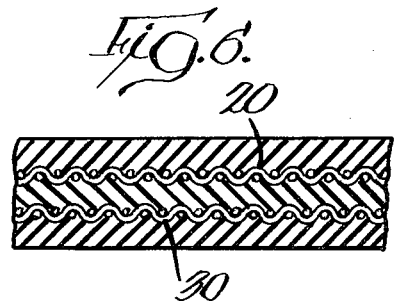

FIGS. 3 through 6 illustrate a variety of composites that may be fabricated in the production of the flexible sheet material of the present invention. As shown in FIG. 3, as discussed above, one or more layers of the mesh 20 may be covered on one side with a layer of elastomer 22, or a second layer 26 may be applied on the other side of the mesh, as shown in FIG. 4. In either case, the mesh 20 is embedded in the elastomer, which is then cured or vulcanized to form a composite sheet, such that the mesh provides a reinforcing matrix in the sheet. A multiple layer composite having spaced layers 20 and 30 of mesh is shown in FIG. 6. The construction shown in FIG. 6 is preferably fabricated by applying elastomer to both sides of a flattened tube of knitted material, such that the knitted material comprises two layers connected at a pair of opposite edges.

As shown in FIG. 5, it is also possible to provide a composite of fluoroelastomer that includes a layer of the wire mesh 20 and a separate layer 40 of a textile, particularly a woven or knitted fabric comprising organic fibers or inorganic fibers such as glass, ceramic, asbestos or the like, or a combination of wire and fiber. It may be seen that the two layers 20 and 40 are separated and bonded together by the elastomer 50.

Although not shown herein, it is possible and sometimes desirable to use the material of the present invention in combination with separate plies of other known materials, particularly where added insulation is desired.

The expansion joint of the present invention provides unique properties and benefits which were heretofore unavailable in conventional joints made of elastomer coated fabrics. Prior art expansion joints were reinforced with woven fabrics, and the resulting material could not be stretched to any significant degree. The wire mesh reinforced expansion joint is easily capable of recoverable elongation in excess of 50 percent and usually in excess of 75 percent, which is not obtainable in any other comparable expansion joint. The present expansion joint can easily accommodate substantial and continuous axial, lateral and torsional movements that are encountered in actual service conditions.

The expansion joint of the present invention is also capable of withstanding higher operating temperatures than prior art joints. Modern specifications require such joints to operate at 300 to 400 degrees F. on a continuous basis with excursions up to 600 to 700 degrees F. for up to 8 hours. Other materials or combination of materials tend to fail or become unduly brittle at such temperatures, such as fluoroelastomers reinforced with glass fibers, asbestos fibers, or synthetic polymer fibers.

A further benefit of the expansion joint of the present invention is that it is resistant to corrosive gasses or acids at high operating temperatures. This is not the case when the wire mesh is replaced with other materials such as glass, asbestos or polymer fibers, which tend to absorb the acids and degrade the bond between the fiber and elastomer.

We claim:

1. An expansion joint for connecting a pair of adjacent spaced ducts and the like in a fluid tight relationship, said expansion joint comprising a circumferentially continuous belt of flexible material and means for connecting said belt between said spaced ducts in a fluid tight relationship, said belt being composed of a laminated sheet material comprising a layer of stretchable knit metallic wire mesh embedded on both sides with a cured fluoroelastomer sheet, said expansion joint being capable of recoverable elongation in excess of 75 percent and being capable of substantially continuous exposure to temperatures in the order of about 300 to about 400 degrees F. and excursions up to about 600 to about 700 degrees F. without substantial loss of flexibility.

2. The expansion joint of claim 1 wherein said fluoroelastomer is selected from the group consisting of copolymers of vinylidene fluoride and hexafluoropropylene, terpolymers of vinylidene fluoride, hexafluoropropylene and tetrafluoroethylene, and alternating copolymers of propylene and tetrafluoroethylene.

3. The expansion joint of claim 1 wherein said belt has a thickness of from about 0.06 to about 0.250 inches.

4. The expansion joint of claim 1 wherein said wire mesh is provided in two layers, with a pair of opposite edges of said layers being connected.

5. The expansion joint of claim 1 wherein a layer of insulation is provided on one side of said belt.

6. The expansion joint of claim 1 wherein said belt is provided with flanges at opposite edges thereof, said flanges being connected to flanges on said ducts.

7. The expansion joint of claim 1 wherein said fluoroelastomer covers both sides of said wire mesh and is connected through said mesh.

8. An expansion joint for flexibly connecting a pair of adjacent spaced ducts in a fluid tight relationship, said expansion joint comprising a continuous belt of sheet material in the form of a tube and means adjacent the edges of said tube for connecting said expansion joint between said spaced ducts in a fluid tight relationship, said belt comprising a fluoroelastomer sheet and a reinforcing material embedded in said sheet, said fluoroelastomer being selected from the group consisting of copolymers of vinylidene fluoride and hexafluoropropylene, terpolymers of vinylidene fluoride, hexafluoropropylene and tetrafluoroethylene, and alternating copolymers of propylene and tetrafluoroethylene, said reinforcing material consisting essentially of knitted wire mesh, said belt being capable of recoverable elongation in excess of 75 percent and being capable of exposure to heat at temperatures in the order of about 300 to about 400 degrees F. and excursions up to about 600 to 700 degrees F.

9. The expansion joint of claim 8 wherein said wire mesh comprises a pair of layers of said mesh, with opposite ends of said layers being connected in the form of a flattened tube.

* * * * *